Feb. 14, 1939.  J. P. FREDERICKSEN  2,146,814

METHOD OF MAKING INSOLES

Filed Aug. 10, 1937

INVENTOR:
James P. Fredericksen
By his Attorney,
Harlow M. Davis

Patented Feb. 14, 1939

2,146,814

UNITED STATES PATENT OFFICE 2,146,814

METHOD OF MAKING INSOLES

James P. Fredericksen, Wollaston, Mass., assignor to United Shoe Machinery Corporation, Paterson, N. J., a corporation of New Jersey Application August 10, 1937, Serial No. 158,381

5 Claims. (Cl. 12—146)

This invention relates to insoles and methods of making insoles and is illustrated herein by way of example with reference to its use in the manufacture of welt shoes.

Objects of the invention are to provide an improved method of making insoles having lasting ribs thereon, and to provide improved insoles.

To the attainment of these objects and in accordance with one aspect or feature of the invention, an insole is provided at its marginal portion with inner and outer layers of different widths, these layers are positioned with their edge faces flush with each other, and, while the layers are held in such position, the material of the wider layer inwardly of its edge face is shaped to form a rib on the insole. As herein illustrated, the outer layer of the insole is wider than the inner layer and layers are held in position to produce the rib by fastening means which penetrates both layers but does not show on the inner surface of the insole. Preferably, and as herein illustrated, the fastening means comprises stitches which enter the edge face of the inner layer and pass obliquely through the outer layer. Cement is previously applied to the opposing surfaces of said inner and outer layers so that, after the stitches holding the edge faces of these layers in flush relation are inserted, the outer layer may be bent upon itself to form an upstanding rib which will be held permanently in position by the cement as the rib is formed.

In accordance with another aspect of the invention there is provided, as an improved article of manufacture, an insole having formed at its marginal portion a rib composed of a single, continuous layer of material integral with the body portion of the insole, said rib being held permanently in position by cement and by stitches which emerge from the edge face of the insole and do not show on the inner surface thereof.

With the above and other features and objects in view, the invention will now be described in connection with the accompanying drawing and will thereafter be pointed out in the claims.

Figure 1:
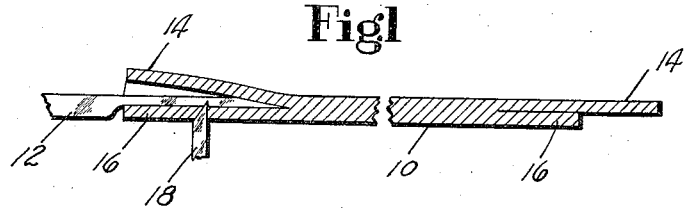
Fig. 1 is a transverse sectional view of an insole, drawn on an enlarged scale and broken out at the center, illustrating the channeling and feather reducing operations and the channel flap and feather produced thereby.

The method of the present invention comprises forming a lasting rib on a relatively thin flexible insole by separating the marginal portion of the insole into inner and outer layers and bending the outer layer upon itself to provide an upstanding rib. An insole 10 of leather or other suitable material, preferably between three and four irons thick, is cut or died out about a quarter to three-eighths of an inch larger than is to be required in the shoe. The marginal portion of the insole is then channeled by a cut extending inwardly from the edge face of the insole and parallel to the plane thereof. The width of the channel is approximately equal to the width of the usual lasting allowance of a shoe upper plus the amount that the insole was cut larger than the required size. As shown in Fig. 1, a channel knife 12 performs the channeling operation to produce an upper layer or channel flap 14 and a lower layer or feather portion 16.

Simultaneously with the channeling of the insole, or separately if desired, the feather portion 16 is reduced in width by approximately one-half to leave a feather portion which is substantially equal in width to the width of the lasting allowance usually required for securing a shoe upper in lasted relation to an insole, that is, from about three-eighths to one-half an inch. The feather reducing operation may be conveniently performed by a vertical knife 18 arranged to follow the channeling knife 12 around the periphery of the insole, as illustrated in Fig. 1. The channeling and feather reducing operations may be performed by hand or they may be performed with the aid of a machine of the type disclosed in Letters Patent of the United States No. 1,023,801, granted April 23, 1912, on an application filed in the name of Frederic E. Bertrand, this machine, however, being modified to omit the usual inside channel knife and to include the vertical feather reducing knife 18. The right-hand portion of Fig. 1 illustrates the insole after the channeling and feather reducing operations have been performed.

Figure 2:
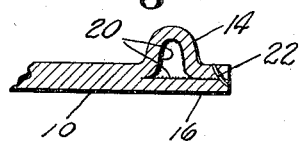
Fig. 2 is a transverse sectional view of the right-hand portion of the insole after the channel flap has been located in rib forming position and secured in such position by stitches.
Figure 3:
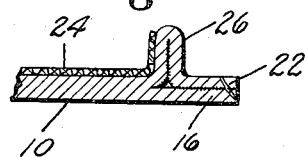
Fig. 3 is a sectional view similar to Fig. 2 after the channel flap has been shaped to form a rib on the insole.

The channel flap 14 is next coated on its inner surface with cement such, for example, as a suitable latex composition and the outer or adjacent opposing surface of the reduced feather 16 is likewise coated with this cement. As is well known, latex cement is a water-dispersed rubber mixture or emulsion which may be applied to opposing surfaces of material such as leather and is not sufficiently tacky to cause the materials to stick together immediately but only after an interval has elapsed during which the water evaporates. Preferably, the latex emulsion in the present instance should contain enough water to prevent the cement from becoming tacky for about five minutes although, if desired, in order to facilitate carrying out the method, this period may be extended to fifteen or twenty minutes. In Fig. 2, the cement on the opposing surfaces of the reduced feather 16 and channel flap 14 is indicated by the reference numeral 20.

The outer layer or channel flap 14 is now bent upon itself, as illustrated in Fig. 2, to cause its inner portion to bulge upwardly and to position the edge face of the outer layer flush with the edge face of the inner layer or feather 16, this, of course, being done while the cement is still in a non-tacky condition. The marginal portion of the outer layer or channel flap 14 is then secured to the marginal portion of the inner layer or feather by fastening means such, for example, as stitches 22. The stitches 22 enter the edge face of the feather 16 and extend obliquely through the outer layer or channel flap 14, these stitches being commonly termed "felling" stitches. In this way the feather and channel flap are secured permanently together before the cement has become tacky with their edge faces flush with each other and with the inner portion of the channel flap bulging to provide excess material in a position to be thereafter shaped into an upstanding rib integral with the insole. Since the stitches 22 emerge from the inner layer 16 at its edge face they do not, of course, show on the inner surface of the insole 10. The stitches 22 may be inserted by hand or by a sewing machine of any well-known type having instrumentalities constructed and arranged to perform a felling stitch operation on the edge portions of overlapping materials.

The insole 10 may now be reinforced on the area of its outer surface lying inwardly of the feather 16 by fabric material 24 such as Gem duck, the margins of the reinforcing material being wide enough to cover a portion of the channel flap 14. In applying a fabric reinforcement to a ribbed insole a sheet of fabric material is usually stuck to the outer surface of the insole by hand and then the marginal portion of the fabric is stuck against the inner side of the rib by machine, at which time the rib is also shaped or formed into a proper upstanding position and the excess of reinforcing material trimmed off at the top of the rib. A machine which may be conveniently used in performing this operation is that of the type, disclosed in United States Letters Patent No. 1,726,800, granted September 3, 1929 on an application filed in the name of Frederic E. Bertrand. In the present case, therefore, the machine, or, if the operation of shaping the rib is performed manually, the operator, will bend the excess bulged material of the outer layer 14 upon itself until its outer or marginal portion lies flat against the feather 16 and its inner portion extends upwardly to form an upstanding rib 26, the rib preferably, although not necessarily, extending substantially at right angles to the plane of the insole. As stated above, this operation is not performed until the cement 20 between the outer and inner layers 14 and 16 has become sufficiently tacky to cause these layers to stick together and to cause the doubled-over portion of the outer layer 14 to stick to itself as the rib is being formed. The rib 26 may be formed or shaped in this same manner whether or not a reinforcement such as the fabric material 24 is applied to the insole since in some cases it may be preferable to omit the fabric reinforcement.

Figure 4:
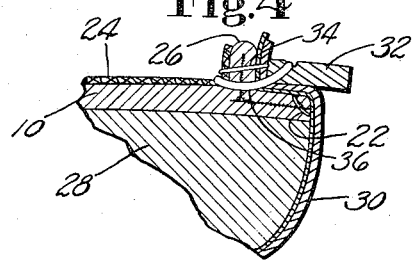
Fig. 4 shows the insole assembled on a last with a shoe upper and a welt secured to the rib.
Figure 5:
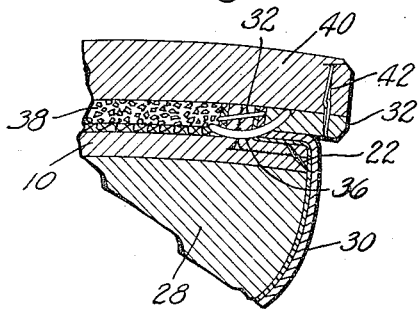
Fig. 5 illustrates the shoe after an insole has been attached.

The insole 10 is now ready to be incorporated in a shoe and it may be mounted on a last 28 (Fig. 4), and a shoe upper 30 and a welt 32 may be secured to the rib 26 in any usual manner, for example, by staples 34 and inseam stitches 36, the inseam stitches preferably being located at the base of the rib below the staples 34. An inseam trimming operation is then performed to remove the excess portions of the upper and rib and the shoe may be completed by adding whatever filler material 38 (Fig. 5) may be required and by attaching an outsole 40 to the welt 32 by stitches 42. After the outsole has been attached the usual finishing operations may be performed in the customary manner and the last 28 pulled from the shoe.

Since the stitches 22, which initially held the edge faces of the channel flap 14 and the feather 16 flush with each other until the rib was formed, and which now reinforce the cement securing the marginal portions of these layers together, were inserted so that they entered or emerged from the edge face of the inner layer 16, they will not show on the inner surface of the insole 10 after the last is removed from the shoe so that the use of a slip sole in the shoe is optional. The present invention provides a convenient and efficient method of forming a strong, integral lasting rib on a relatively thin insole of the so-called uni-channel type which insures a smooth edge face on the feather portion of the insole.

Although the invention has been disclosed herein with reference to the manufacture of welt shoes, it is to be understood that it is not limited to such shoes in its application and may be practised with equal facility and advantage in the construction of other types of shoes in which the upper is secured in lasted relation to the insole by attachment to a lasting rib.

Having thus described my invention, what I claim as new and desire to secure by Letters Patent of the United States is:

1. That improvement in methods of making insoles which comprises providing an insole having at its marginal portion inner and outer layers of different widths, positioning said layers with their edge faces flush with each other, and, while maintaining said edge faces against movement relatively to each other, shaping material inwardly of the edge face of the wider layer to form a rib on the insole.

2. That improvement in methods of making insoles which comprises providing an insole having at its marginal portion inner and outer layers, securing an edge portion of said outer layer to said inner layer by fastening means which penetrates both layers but does not show on the inner surface of said inner layer, and bending an adjacent portion of said outer layer into a position to form on the insole an upstanding rib.

3. That improvement in methods of making insoles which comprises providing an insole having at its marginal portion inner and outer layers, securing said outer layer to said inner layer by stitches which do not show on the inner surface of said inner layer, and bending a portion of said outer layer adjacent to the stitches into a position to form on the insole an upstanding rib.

4. That improvement in methods of making insoles which comprises providing an insole having at its marginal portion an inner layer and an outer layer of greater width than said inner layer, securing said layers together with their edge faces flush with each other by stitches which enter the edge face of said inner layer and pass obliquely through both layers so that no stitches show on the inner surface of the insole, and bending the wider outer layer upon itself to produce a rib on the insole.

5. That improvement in methods of making insoles which comprises cutting an outside channel in the marginal portion of an insole thereby forming a feather and a channel flap, reducing the width of said feather, applying to the opposed surfaces of the flap and feather cement which requires a short time to become tacky but then sticks permanently, positioning the channel flap with its edge face flush with the edge face of the reduced feather, inserting stitches in the feather and flap to hold their edge faces in flush relation, said stitches passing obliquely through said feather and flap and emerging at the edge face of the feather so that no stitches show on the inner surface of the insole, and, after the cement has become tacky, bending the inner portion of the channel flap upon itself to produce on the insole an integral upstanding rib.

JAMES P. FREDERICKSEN.

CERTIFICATE OF CORRECTION.

Patent No. 2,146,814. February 14, 1939.

JAMES P. FREDERICKSEN.

It is hereby certified that error appears in the printed specification of the above numbered patent requiring correction as follows: Page 1, second column, line 5, for the word "insole" read outsole; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.